May 3, 1966    T. E. HATTERSLEY, JR., ETAL    3,249,867
SYSTEM FOR PULSE TIME MEASUREMENT
Filed April 20, 1961      2 Sheets-Sheet 1

INVENTORS.
THOMAS E. HATTERSLEY, JR.
JAMES W. KEEBLER
BY
ATTORNEY

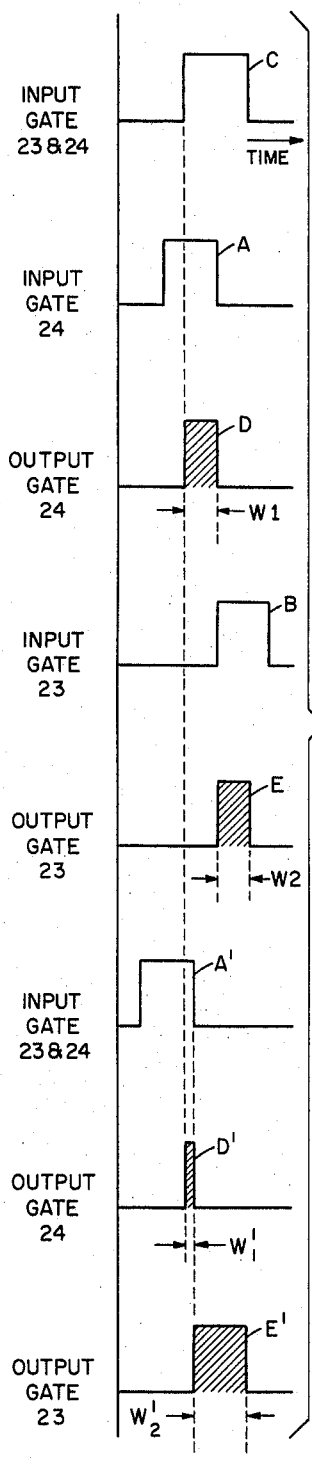
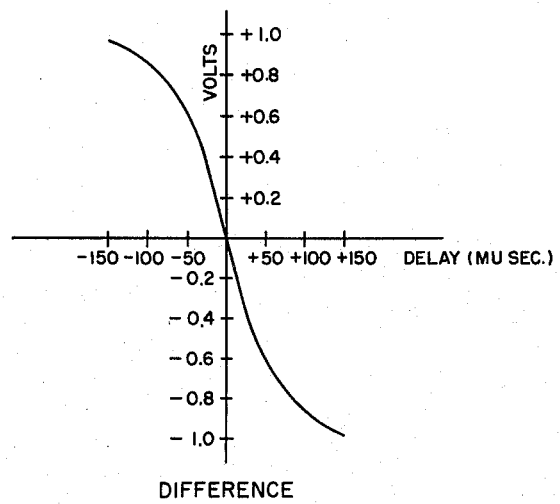
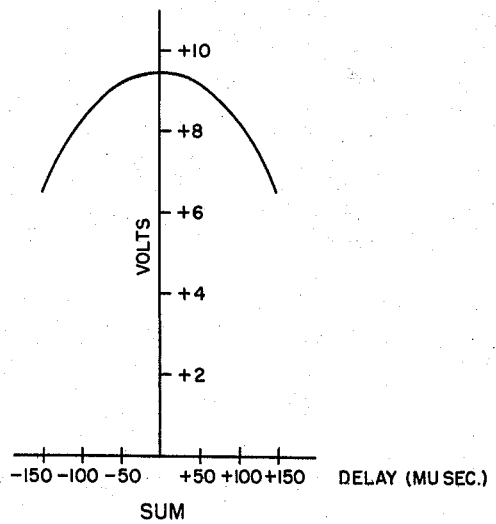
Fig. 4
Fig. 2
Fig. 3

United States Patent Office 3,249,867
Patented May 3, 1966

3,249,867
SYSTEM FOR PULSE TIME MEASUREMENT
Thomas E. Hattersley, Jr., Rochester, N.Y., and James W. Keebler, Dayton, Ohio, assignors to General Dynamics Corporation, Rochester, N.Y., a corporation of Delaware
Filed Apr. 20, 1961, Ser. No. 104,383
4 Claims. (Cl. 324—68)

This invention relates to time measurements and is particularly directed to means for measuring the precise time of occurrence of one pulse with respect to the time of occurrence of another pulse.

Time intervals between radio frequency pulses have heretofore been measured by stroboscopic techniques, time basis in this technique being provided with a linear sweep circuit. Delay lines of either distributed or lumped impedances are also extensively used to measure increments of time intervals. Such techniques leave much to be desired when accuracies of a few thousandths of a microsecond are required. It is particularly difficult in the manufacture of delay lines to correctly place the taps on the line inductances to yield with close tolerance a specified time delay.

An object of this invention is to provide an improved means for measuring the time of occurrence of pulses.

A more specific object of this invention is to provide an improved means for measuring the time interval between two pulses.

A still more specific object of this invention is to provide improved pulse measuring means comprised of inexpensive, wide-tolerance, delay lines.

The objects of this invention are attained by a fixed delay line having a delay period less than the duration of the pulse to be identified so that the voltage of said pulse will occur simultaneously at the input and output of the delay device. Means are then provided for comparing the voltages at the input and ouput terminals of said delay device. The energy content of the voltage of the pulse at the input and output terminals of the delay device may be separately integrated and then equated to show precisely when the pulse is "centered" in the delay device. Logic AND gate circuits are employed to sample the input-output voltages at the instant the pulse is "centered" in the delay line, a second pulse, which may serve as a time reference, being employed to operate the gate circuits.

Other objects and features of this invention will occur to those skilled in the art by referring to the specific embodiment described in the following specification and shown in the accompanying drawings in which:

FIG. 2 shows the relationship of delay to difference voltages at the output of the system of FIG. 1;

FIG. 3 shows the relationship of time delay with the sum voltages at the output of the system of FIG. 1; and FIG. 4 is a family of voltage pulse curves for illustrating the operation of the circuits of FIG. 1.

Figure 1:
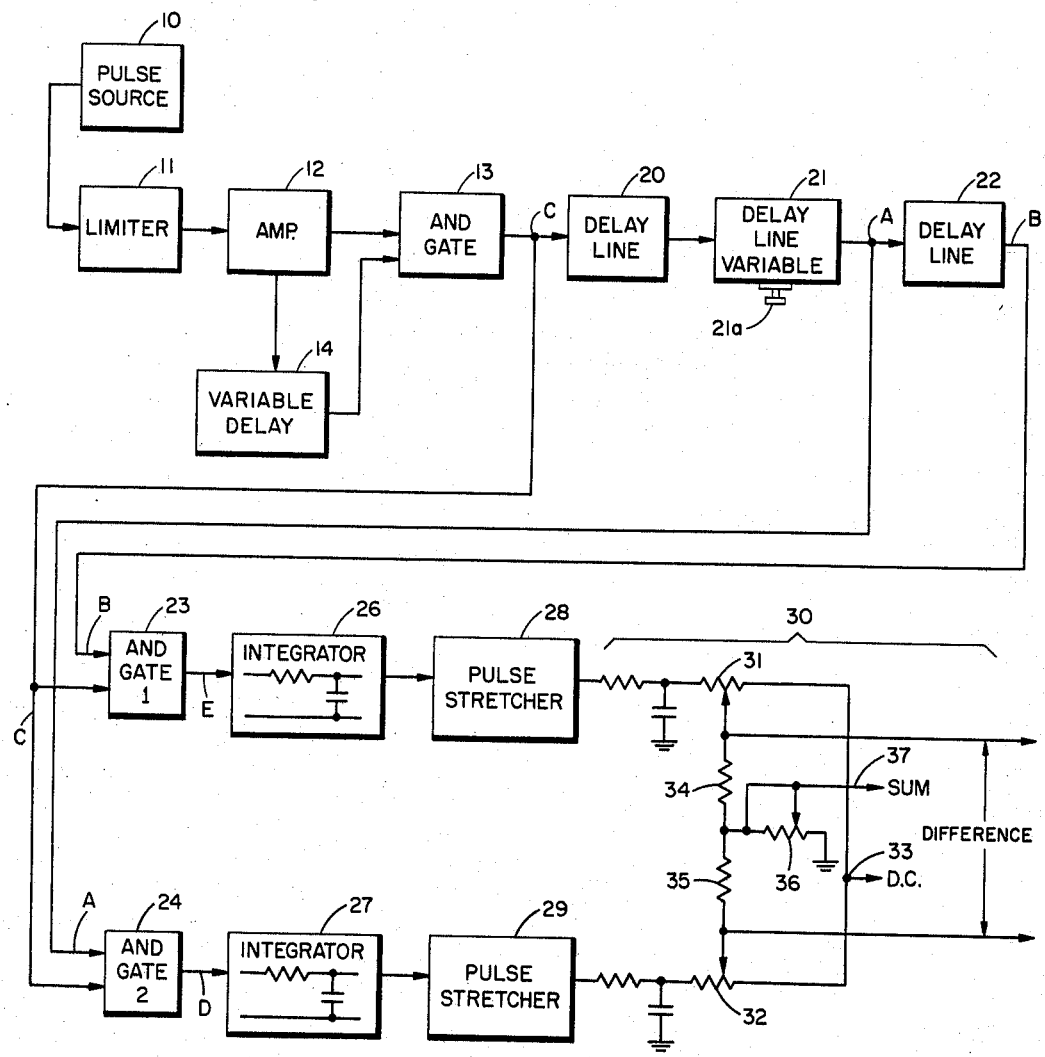
FIG. 1 shows a block diagram of the preferred embodiment of the pulse measuring system of this invention.

The pulse source 10 of FIG. 1, may, for example, comprise the video output of a radio-transmitter receiver employed in combination with a radio beacon or transducer for measuring the transit time of a pulse to and from the beacon. It is important that the time of arrival of a reply pulse with respect to its outgoing interrogating pulse be accurately measured. Such pulses are preferably passed through the limiter 11 to insure that the pulses are all of equal amplitude. By establishing a constant amplitude for all pulses, phase distortion in all following amplifiers will remain constant. Amplifier 12 is employed to increase the pulses to the desired voltage level. Distortions outside the system of FIG. 1 may, nevertheless, cause differences in duration and wave shape of the pulses. To reduce the pulses all to a common length or duration, it is preferred that the output of the amplifier 12 be passed through the AND gate 13 which is held open a measured length of time determined by the variable delay device 14. Pulses to be compared in time now appear at the output of AND gate 13 with equal amplitude, duration and wave shape.

The equalized pulses then pass successively through delay lines 20, 21 and 22. Delay line 22 has a fixed time delay of about one-quarter, preferably, of the duration of the received pulses. It will appear then that each pulse that is wider than the fixed delay as it proceeds through delay line 22 will simultaneously produce voltages A and B corresponding to pulse portions for a finite time at the input terminal A and the output terminal B of the delay line. According to an important and characteristic feature of this invention, means are provided for equating the input and output voltages A and B and for identifying precisely when a pulse is "centered" in delay line 22. For this purpose, the input and output voltages A and B are, respectively, applied to input terminals of AND gates 23 and 24. The other input terminals of each AND gate are connected together and are connected to a point in the system which will enable AND gates 23 and 24 at the proper time to permit passage of voltages A and B through the gates. Conveniently, this control pulse C is obtained from the input of delay line 20. The delay period of delay lines 20 and 21 are adjusted to the suspected interval between the two pulses received. Where this time interval may be within a known range, it is convenient to make delay line 20 fixed and delay line 21 variable. Hence, by adjustment of delay line 21, as by the manual control knob 21a, the arrival time of voltage C at AND gates 23 and 24 may be made to straddle or coincide with both voltages A and B. By adjustment of variable delay line 21, the duration and energy content of the pulse portions A and B may be made equal.

To indicate equality of the pulse portions A and B, the output of AND gate 23 is integrated in integrator 26. The output of AND gate 24 is integrated in integrator 27. Integration, as contemplated here, comprises a resistance-condenser network which will produce a relatively steady direct current voltage proportional to the energy content of the applied pulse. Where the pulses are of minute values, the impedances of the integrator circuits must, of course, be high. Pulse stretcher 28 is connected to the integrator 26 to amplify and lengthen the pulse information of the integrator 26. Pulse stretcher 29 likewise is connected to the output of integrator 27 to increase to the desired level the energy content of the pulse information of integrator 27.

The pulses thus integrated and stretched are compared in circuits 30 for deriving, firstly, a voltage which is proportional to the sum of the two pulse portions A and B, and for deriving, secondly, a voltage which is proportional to the difference between pulse portions A and B. Conveniently, load resistors 31 and 32 are connected, respectively, between the D.C. source 33 and the pulse stretchers 28 and 29. The voltage divider comprising resistors 34 and 35 are serially connected between adjustable taps on resistors 31 and 32. Adjustments of the taps are made to balance the output difference voltage. Current flowing in resistors 34 and 35 are added in resistor 36 to produce at output terminal 37 a voltage which is proportional to the sum of the energy content of pulse portions A and B. The difference voltage is derived from across the ends of the voltage divider 34-35.

FIG. 2 shows the manner in which the difference voltage across the divider 34-35 varies as the delay of delay lines 20 and 21 is varied from a delay which is too short to a delay which is to long with respect to the spacing between the two received pulses. As expected, the difference voltage is zero when the delay of delay lines 20 and 21 are equal to the pulse spacings minus half the delay in line 22 and the pulse first, in time, is "centered" in delay line 22.

It has been found that, as shown in FIG. 3, the sum voltages measured at terminal 37 are a maximum when the delay of delay lines 20 and 21 minus half the delay in line 22 equals the pulse spacing, and that this voltage drops as the delay is varied to plus or minus values from the center value.

The pulse waveforms of FIG. 4 demonstrate the operation of the system of FIG. 1. Let it be assumed the delays of delay lines 20 and 21 are so adjusted that the waveform C is applied to the input of both AND gates 23 and 24 when the voltages at A and B are equal. It becomes apparent then that the energy content W1 in the pulse D at the output of AND gate 24 is equal to the energy content W2 of the pulse E at the output of AND gate 23. The integrated values of W1 and W2 produce equal D.C. voltages at the output of the pulse stretchers and the difference voltage is zero while the sum voltage is a maximum. Such null values are easily obtained by varying the delay line 21 to either side of the null value and observing the output on a voltage or current meter (not shown).

Assuming now that the delay of lines 20 and 21 is different than the time interval between the two pulses minus half the delay in line 22, then, the pulse C occurs when the pulses A and B are unbalanced. If the period of coincidence in AND gate 24 is shortened, then, the energy content, $W'_1$, of pulse D' at the output of AND gate 24 diminishes, as shown in FIG. 4. Complementarily, the period of coincidence of the two voltages at the input of AND gate 23 is lengthened and the energy content, $W'_2$, of pulse E' at the output of AND gate 23 is increased. The imbalance of pulse energy $W'_1$ and $W'_2$, as shown in FIG. 4, produces a substantial difference voltage of the proper polarity to indicate to the operator the direction and amount of the imbalance.

It has been found that variations of the variable delay line 21 may cause variations in the amplitude of the pulse portions A and B, caused apparently by changing insertion loss effects of the delay line 21. To insure that the energy contents of the pulse portions A and B that are compared in the comparing circuits 30 will faithfully reflect the period of coincidence of the pulse portions and be independent of possible amplitude variations, it is proposed that any conventional amplitude clipping or limiting devices, not shown, be incorporated in AND gates 23 and 24, respectively. The peak values and shapes of the sum output of FIG. 3 and the difference output of FIG. 2 are more uniform over the system range because of this amplitude limiting and are therefore made adaptable as go, no-go system outputs.

Good results have been obtained with the system of FIG. 1 in measuring the spacing between pulses of less than 2.0 microseconds and with pulse widths of .250 microsecond. When calibrated, the system of FIG. 1 will measure such pulse spacings to within 0.5 nanosecond. A nanosecond is defined as $1.0 \times 10^{-9}$ seconds. To obtain such accuracies, it is merely necessary to calibrate the dial 21a of delay line 21 in terms of the wavelength at the output of any standard frequency source. It is not necessary to employ delay lines at 20, 21 or 22 with absolute delay accuracies greater than the accuracies of inexpensive commercially obtainable delay lines.

What is claimed is:

1. A system for measuring the time interval between a first pulse of predetermined duration and a second pulse which arrive from a source, said system comprising first means connected to said source for limiting the amplitude of said pulses to a common level, second means connected to said first means for approximately adjusting the pulse duration of each of said pulses to a common value, a first delay device, the delay period of said device being less than said pulse duration so that the voltage of said pulse will occur simultaneously at the input and output of said first device, a second delay device connected between said second means and said input of said first delay device circuits for isolating the voltages at said input and output, means responsive to said pulse at the input of said other delay device for comparing the isolated voltages and for producing a distinct voltage at the instant when said voltages have a predetermined ratio, and means for measuring the time interval between said instant and the time of occurrence of said second pulse.

2. A system for measuring the time interval between a first pulse of predetermined duration and a second pulse, said system comprising first means connected to the source of said pulses for limiting the amplitude of said pulses to a common level, second means connected to said first means for approximately adjusting the pulse duration of each of said pulses to a common value, a variable delay line and a fixed delay line, said delay lines being serially connected to said second means, a first and a second AND gate, one input of each AND gate being connected, respectively, to the input and output terminals of said fixed delay line, said fixed delay line having a delay period which is less than said predetermined duration of said first pulse so that the voltage of said first pulse will occur simultaneously at the input and output of said fixed delay line, the input of said variable delay line being coupled to another input of each of said AND gates for opening said gates and passing said voltage to the gate output circuits when the variable delay is so adjusted as to produce coincidence of voltage at the gate inputs, and means for comparing the output voltages of said first and second gates.

3. A system for measuring the time interval between a first and a second pulse of predetermined spacing, said system comprising means for limiting the amplitude of said pulses to a common level, means for approximately adjusting the durations of said pulses to a common value, a variable delay line connected to said pulse adjusting means, a fixed delay line coupled to said variable delay line, the delay period of said fixed delay line being less than the pulse duration so that voltages due to an individual pulse will occur simultaneously at the input and output terminals of said fixed delay device, a first AND gate and a second AND gate respectively coupled to said input and output terminals, and means responsive to said second pulse when said variable delay corresponds to said predetermined pulse spacing for opening said gates and passing said simultaneous voltages, and means for comparing the passed voltages.

4. The invention defined in claim 3 further including means coupled to said variable delay line for reading out absolute values of the time interval between said first and second pulses.

References Cited by the Examiner

UNITED STATES PATENTS

| 2,939,075 | 5/1960 | Schwab | 324—68 |
| 2,981,942 | 4/1961 | Gross | 343—13 X |
| 3,040,311 | 6/1962 | Segerstrom | 343—13 X |
| 3,074,017 | 1/1963 | Sunstein et al. | 324—57 |
| 3,111,622 | 11/1963 | Zechter et al. | 324—68 X |
| 3,118,109 | 1/1964 | Rabow et al. | 324—68 |

WALTER L. CARLSON, *Primary Examiner.*

J. P. O'BRIEN, C. A. S. HAMRICK, M. J. LYNCH,
*Assistant Examiners.*